United States Patent [19]

Hippert, Jr.

[11] 4,030,628
[45] June 21, 1977

[54] TAMPER-PROOF CONTAINER CAP COVER

[76] Inventor: Lawrence Hippert, Jr., Rte. No. 3, New Ulm, Minn. 56073

[22] Filed: Aug. 16, 1976

[21] Appl. No.: 714,769

[52] U.S. Cl. .............................. 220/85 P; 220/210; 220/259
[51] Int. Cl.² .................. B65D 25/00; B65D 54/14; B65D 43/16
[58] Field of Search .......... 220/85 R, 85 P, 86 AT, 220/256, 259, 334, 210, 214

[56] References Cited

UNITED STATES PATENTS

| | | | |
|---|---|---|---|
| 1,989,300 | 1/1935 | Webb | 220/85 R |
| 2,201,521 | 5/1940 | Cook et al. | 220/85 P |
| 2,278,232 | 3/1942 | Anderson | 220/85 P X |
| 3,930,388 | 1/1976 | Barras | 220/210 X |

Primary Examiner—William Price
Assistant Examiner—Steven M. Pollard
Attorney, Agent, or Firm—Merchant, Gould, Smith, Edell, Welter & Schmidt

[57] ABSTRACT

A tamper-proof two-piece cover for container spout caps having a pair of collars which are detachably secured by fasteners about the spout of the container and a top which when latched to the collars completely encloses the container cap and the collar securing fasteners. Each collar has a pair of threaded tubular members disposed at its periphery. A pair of bolts are received in the threaded tubular members to secure the collars about a container spout. A top is hinged to one collar and rotatable about the hinge to a position where the top completely encloses the container cap and the bolts. A latch secures the top to one of the collars so that the top may be locked in place over the cap. The collar members may be configured to fit standard sized tank spouts and the inter-collar spacing is further adjustable to fit non-standard sized tank spouts by simply varying the degree to which the retaining bolts are screwed into the threaded tubular members.

7 Claims, 4 Drawing Figures

U.S. Patent June 21, 1977 4,030,628
FIG. 1
FIG. 2
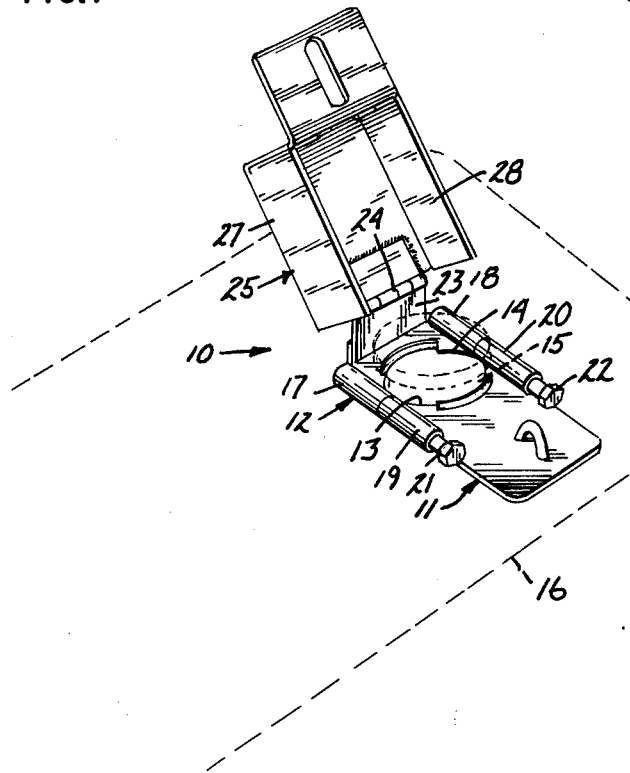
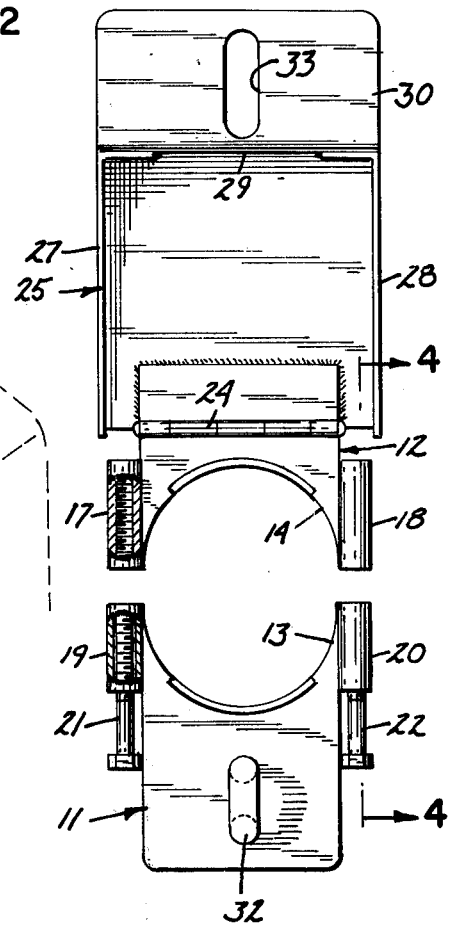
FIG. 3
FIG. 4
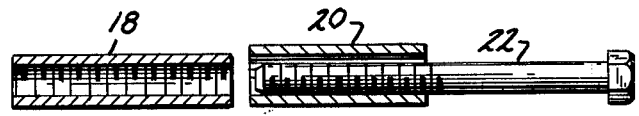

TAMPER-PROOF CONTAINER CAP COVER

BACKGROUND OF THE INVENTION

This invention relates generally to tamper-proof covers for container caps and, more particularly, for such covers designed to be utilized in conjuction with fuel tanks for trucks or other heavy-duty industrial equipment.

Trucks or other types of industrial equipment must often be left unguarded for extended periods of time subjecting the equipment to theft and vandalism. For example, businesses employing fleets of vehicles generally leave the vehicles in an easily accesible fleet parking lot following the close of the business day. Although the lot may be fenced, a fence is no guarantee that a determined thief will not be able to remove gasoline from the tanks of the vehicles. In view of the nation's energy problems fuel has become a precious commodity and more attractive as a stolen good. To prevent such unauthorized entry into vehicle fuel tanks, covers have been developed which fit over the fuel tank cap and prevent its removal. In many cases the covers are permanently attached to the tank or spout preventing the vehicle owner from removing the cover and utilizing it on a different vehicle. Those covers which are detachable are not sufficiently adjustable so that the tamper-proof cover may be applied to spouts having a wide range of diameters. Thus, with such limited flexibility the prior art covers are generally left in place on tanks even though their use may be unnecessary during certain periods of time, for example, when the vehicles are in the shop for repairs.

The present invention overcomes these problems associated with the prior art gas tank cap covers by providing a detachable two-piece collar easily adjustable to fit varying size tank spouts. The present invention is rapidly mountable to facilitate transfer of the protective two-piece cover from one vehicle to another. Additionally, the mounting apparatus is completely enclosed when the cover is locked preventing removal by unauthorized personnel. Additionally, the cover may be left on the gas tank during the course of the working day as it does not interfere with refilling the tank as often as required.

SUMMARY OF THE INVENTION

The present invention is a tamper-proof two-piece cover for container caps having a pair of collars which fit about the spout of the container and which are secured about the spout by detachable mounting means. The cover further includes an enclosure pivoted to one of the collars and latched to the other collar so that the container cap and mounting means are completely enclosed.

The mounting means includes aligned pairs of threaded tubular members diaposed along the periphery of each of the collars. Bolts are received in the threaded tubular members. The cover may be attached to various size spouts as the size of the spout is simply determinative of how far the bolts must be screwed into the tubular members.

The latch includes a loop on one of the collars and a mating slot in an extension of the enclosure. The latch passes through the slot and a padlock is placed through the loop. With the padlock so placed the enclosure prevents access to the container cap and the securing bolts. The cover may remain on the spout when unlocked or it may be easily removed and applied to another spout having the same or a different diameter.

The two-piece cover is made of rugged material particularly adaptable for use with industrial fleet trucks or other heavy-duty industrial equipment.

While in the accompanying drawing and the following detailed description of the preferred embodiment the enclosure is disclosed as a box, it s understood that other enclosures may be utilized as long as they render the cap and mounting means inaccessible. Additionally while hexagonal head bolts are shown in the drawings it is to be understood that other securing means, such as allen screws are within the scope of the invention.

BRIEF DESCRIPTION OF THE DRAWINGS

FIG. 1 is a perpective view showing the tamper-proof two-piece cover in place about the spout of a container and in the open position;

FIG. 2 is a plan view of the cover also in the open position;

FIG. 3 is a side elevation of the cover shown with the top locked over the container cap; and FIG. 4 is a sectional view of the cooperating bolts and threaded apertures taken along the line 4—4 of FIG. 2.

DECRIPTION OF THE PREFERRED EMBODIMENT

Referring to the drawing, wherein like numerals represent like parts throughout the several views, there is shown in FIG. 1 a tamper-proof cover 10 having two basically rectangular plate collars 11 and 12. The collars have opposed semicircular cut-out portions which define surfaces 13 and 14 that contact the outer surface of a spout 15 extending from a gas tank 16. The opposed surfaces 13 and 14 comprise raised semicircular lip portions offering increased contact surface area for engaging the spout 15 and providing increased structural support to prevent buckling of the collar members when threaded together, as hereinafter described. Disposed along the sides of each collar are tubular members 17, 18, 19 and 20, of which, 17 and 18 are internally threaded as particularly illustrated in FIG. 4. A pair of bolts 21 and 22 are received within the threaded tubes to secure the collars about the spout.

The collar 12 has an upright wall 23 to which is hinged at 24 an enclosure 25. The enclosure has an upper wall 26, a pair of side wall 27 and 28, a front wall 29, and a front wall extension 30. As shown particularly in FIGS. 2 and 3, the distance between the walls of the enclosure is such that when the enclosrue is rotated about its hinge to cover the gas cap 31 it completely encloses the cap and the bolts which secure the collars together. Thus when the top is locked to the collar it is impossible to remove the collar by unscrewing the bolts. It will be noted that the diameter of the gas cap is typically larger than the neck of the spout so that the cover also cannot be removed by simply lifting it over the cap.

In order to lock the enclosure to the collar a loop 32 is provided on the collar. A slot 33 is formed in the front wall extension 30 and the loop projects through the slot when the top is closed over the gas cap. A padlock 34 may then be simply attached through the loop and the top cannot be raised by unauthorized personnel without breaking the lock or destroying the top itself.

In the operation, the unlocked cover is quickly and easily attached and removed through the bolts and threaded tubular members for use with multiple containers. The cover is adaptable to varying diameter spouts on container since the size of the spout simply determines the extent to which the bolts must be advanced to secure the collars together. The cover is adapted particularly for use in trucks and other heavy-duty industrial applications in which the trucks or industrial vehicles are left unguarded for extended periods of time. The cover effectively prevents the theft of gasoline from the vehicles while they are in such an unguarded state. When the vehicles are in use, the padlock is removed providing easy access to the cap for refilling the tank while at the same time retaining the cover in place.

While I have disclosed a specific embodiment of my invention, it is to be understood that this is for purpose of illustration only, and that my invention is to be limited solely to the scope of the appended claims.

What is claimed is:

1. A tamper-proof two-piece cover for caps on container spouts comprising:
   a. a first collar;
   b. a second collar;
   c. means for detachably mounting said collars together about the spout of the container; enclosure means for completely enclosing said mounting means and the cap on the spout;
   d. a hinge pivotably connecting said enclosure means to said second collar; and
   e. latch means for securing said enclosure means to said first collar whereby said mounting means and cap are completely enclosed and inaccessible.

2. A tamper-proof two-piece cover in accordance with claim 1 wherein said mounting means further comprises:
   a. tubular members on said collars having threaded apertures; and
   b. threaded fastening means received in said threaded apertures.

3. A tamper-proof two-piece cover in accordance with claim 2 wherein said tubular members are aligned pairs of tubular members disposed along the outer periphery of said collars and said threaded fastening means are bolts.

4. A tamper-proof two-piece cover in accordance with claim 2 wherein the latch means further comprises:
   a. a loop disposed on said first collar; and
   b. an extension of said enclosure projecting outward from said enclosure and having an elongated slot disposed so that the loop passes through the slot when the enclosure is in the closed position.

5. A tamper-proof two-piece cover in accordance with claim 4 wherein said collars are rectangular plates having symmetrical cut-out portions for receiving the spout of the gas tank.

6. A tamper-proof two-piece cover in accordance with claim 2 wherein said enclosure means is a box having two pairs of oppositely disposed side walls attached to a top wall.

7. A tamper-proof two-piece cover in accordance with claim 6 wherein said latch means further comprises:
   a. a loop disposed on said first collar; and
   b. a right angle extension of one of said walls projecting outward from said box and having an elongated slot through which said loop passes when said box is in the closed position so that a padlock may be attached to said loop to the lock the cover.

* * * * *

UNITED STATES PATENT AND TRADEMARK OFFICE
CERTIFICATE OF CORRECTION

PATENT NO. : 4,030,628
DATED : June 21, 1977
INVENTOR(S) : Lawrence Hippert, Jr.

It is certified that error appears in the above-identified patent and that said Letters Patent are hereby corrected as shown below:

In column 1, line 57, the word "diaposed" should read --disposed--.

In column 2, line 47, after the word "shown", insert --more--; and in line 49, the second "enclosure" is misspelled.

In column 3, line 2, the word "container" should read --containers--.

Signed and Sealed this

Fourth Day of October 1977

[SEAL]

Attest:

RUTH C. MASON
Attesting Officer

LUTRELLE F. PARKER
Acting Commissioner of Patents and Trademarks